Patented Feb. 5, 1952

2,584,731

UNITED STATES PATENT OFFICE 2,584,731

MANUFACTURING METHOD OF SOLID L-MONOSODIUM GLUTAMATE MONO-HYDRATE

Tetsuwo Ogawa, Kawasaki, Kanagawa Prefecture, Japan, assignor to Ajinomoto Kabushiki Kaisha, Tokyo, Japan, a corporation of Japan No Drawing. Application May 25, 1950,.
Serial No. 164,295

3 Claims. (Cl. 99—16)

This invention relates to the preparation of mono-sodium L-glutamate mono-hydrate, in a form suitable for use as a seasoning agent.

It is an object of the invention to produce a porous, snow white mono-sodium L-glutamate which is readily soluble in water.

It is a further object to produce a pure, high-quality mono-sodium L-glutamate made in an economical manner.

This is accomplished, in accordance with the present invention, by cooling a saturated solution of crude mono-sodium L-glutamate mono-hydrate to form crystals of mono-sodium L-glutamate penta-hydrate and dehydrating the crystals to produce the purified mono-sodium L-glutamate mono-hydrate crystals suitable for use as a seasoning agent.

Mono-sodium L-glutamate for a seasoning agent is usually produced as crystals of very fine powder by vaporizing and concentrating it in a vacuum pan, but it comprises fine powdery crystals and it is extremely difficult to separate it perfectly from the mother liquor containing impurities, and its purity is very poor. Moreover, there remains a residue of substantially inseparable iron, and also its color is never pure white. Furthermore, as the particles are too fine, it has the deficiency that when the dried powder is poured or dispersed into water or other liquid, it is not dissolved therein but floats on the surface of the liquor. Therefore, the present inventor, at first, tried to crystallize out a suitable amount of mother crystals by concentrating a solution of mono-sodium L-glutamate under reduced pressure and as a result, succeeded in producing the same type of crystallized particles containing very little iron and other impurities. This was accomplished by keeping an equilibrium between the supply of solution and the quantity evaporated by making up gradually the original solution of mono-sodium L-glutamate and mainly growing mother crystals only to secure a perfect type of crystal without producing a new one in order to separate it easily from the mother liquor. However, the particle of crystals thus obtained are rough and when poured into liquor, they do not float on the surface of the liquor as the known product but sink down into the liquor and are deposited at the bottom of the vessel as they are not readily soluble. They have the deficiency that they are insoluble without considerable stirring. Furthermore, it is necessary to continue heating and evaporating each batch for a long time in order to grow only mother crystals, sodium L-glutamate monohydrate, and since this substance is unstable when heated, it is easily apt to undergo racemization or dehydration. Therefore, there is danger of causing a degradation of the quality of the product as to taste and coloration, as well as causing a lessening of the yield.

As a result of studies on water solutions of mono-sodium L-glutamate in a state of equilibrium i. e., a saturated solution, the present inventor has found that by forming crystals by cooling a concentrated solution, when the temperature of liquor is kept above —0.8° C., crystals of mono-hydrate are produced, while a new type of penta-hydrate crystal is produced at a temperature lower than this. In other words, mono-sodium L-glutamate may be crystallized out under special conditions as crystals of a new type of penta-hydrate in addition to mono-hydrate. This fact has been discovered for the first time by the present inventor. An example thereof is as follows:

| Temperature, °C. | Solubility (as unhydrate) per cent | Solid phase |
|---|---|---|
| 20 | 37.74 | Mono-hydrate. |
| 10 | 36.40 | Do. |
| — 0.8 | 35.22 | Mono and penta hydrate. |
| — 8.5 | 30.78 | Penta-hydrate and ice. |

This invention as applied to the production of a seasoning agent possesses the following advantages:

(1) In the known method of crystallizing out mono-sodium L-glutamate ($C_5H_8O_4N.Na$) about 10.6 parts of crystal water are absorbed, while in the penta-hydrate crystals, 100 parts of mono-sodium L-glutamate may absorb about 53.2 parts of crystal water from the mother liquor. Therefore, as the water in the mother liquor is decreased with crystallizing out of the mono-sodium L-glutamate crystals, concentration of the solution is increased and a greater yield of crystals of mono-sodium L-glutamate of penta-hydrate type is obtained.

(2) When mono-sodium L-glutamate solution is concentrated more than 31% and is cooled rapidly to keep below —0.8° C., the crystals crystallize out as a large type of particle. It is not necessary, therefore, to keep the product in a heated condition to grow mother crystals as in the known method. There is, accordingly, no danger that the quality of the produced seasoning agent would be lessened by racemization on account of heat.

(3) As the crystals mono-sodium L-glutamate produced are large, they are easy to separate from the mother liquor and it is also possible to wash away impurities attached therewith in a simple manner. The product last produced is, therefore, most excellent in its purity. The crystals of mono-hydrate obtained directly by known processes employing the same mono-sodium L-glutamate have the specific rotation degree $a_D^{20} \ldots 25°.0$, while the crystals obtained in penta-hydrate form, show $a_D^{20} \ldots 25°.4$. When it is caluclated as free L-glutamic acid, the former is $a_D^{20} \ldots 31°.8$, while the latter is $a_D^{20} \ldots 32°.3$.

(4) Mono-sodium L-glutamate penta-hydrate is easily dehydrated under atmospheric pressure, or reduced pressure, and is converted into mono-hydrate form by removing four of the five molecules of the water of crystallisation. The original type of crystal particle is therefore restored, but it becomes porous (apparently specific gravity about 0.45) and presents a pleasing snow white appearance. When it is poured into water or other soup, it dissolves soon absorbing liquor in the porous composition without floating on the surface of the liquor or depositing on the bottom of the liquor as in the case of the usual product, and also, as it does not require stirring to dissolve, it is considerably convenient to use.

(5) Even if a low grade of mono-sodium L-glutamate mono-hydrate containing a large quantity of impurities is poured into the mother liquor to dissolve and is kept at a low temperature in accordance with the present invention, the mono-hydrate is transformed into penta-hydrate and at the same time the mother liquor causes self-concentration. The crystal of rough mono-sodium L-glutamate may therefore be reproduced economically in a form excellent for use as a seasoning agent.

Example 100.0 grams of a 36.4% solution of mono-sodium L-glutamate are heated and filtered and rapidly cooled to −8.5° C. The solution is then allowed to stand for 1.5 hours. After evaporating said solution under reduced pressure to a concentration of 46.7% (at +65.0° C. saturated solution), mono-sodium L-glutamate crystallizes out as the penta-hydrate. When the crystals are collected and washed from the mother liquor and dried and dehydrated in hot air at 50–60° C., 26.3 grams of mono-hydrate, corresponding to 65.3% for material, are obtained.

A further quantity of crystals may be obtained by concentrating the mother liquor separated herein under reduced pressure and cooling under the same conditions repeatedly. When the crystals of penta-hydrate thus obtained are dehydrated, 8.1 grams of mono-hydrate may be obtained. Adding up the above two yields, 34.4 grams are obtained, and the total yield corresponds to 85.4%.

I claim:

1. Method of producing a seasoning agent which comprises cooling a saturated water solution of mono-sodium L-glutamate at a temperature below −0.8° C. to crystallize out mono-sodium L-glutamate penta-hydrate and dehydrating the crystallate to produce porous and water soluble mono-sodium L-glutamate mono-hydrate.

2. Method of producing a porous and water soluble mono-sodium L-glutamate mono-hydrate, which comprises preparing a water solution of mono-sodium L-glutamate of at least 31% concentration and cooling it below −0.8° C. to crystallize out mono-sodium L-glutamate as penta-hydrate type crystals and dehydrating said crystals.

3. Method of producing a seasoning agent, which comprises dissolving the powder of an undesirable type of crystal of mono-sodium L-glutamate mono-hydrate crystalline powder in water to form a saturated solution, cooling said solution to crystallize out mono-sodium glutamate penta-hydrate crystals, concentrating said solution and increasing the yield of said crystals by absorbing a large quantity of water of crystallisation and drying said crystals to convert same into porous and readily water soluble mono-sodium L-glutamate.

TETSUWO OGAWA.

REFERENCES CITED

The following references are of record in the file of this patent:

FOREIGN PATENTS

| Number | Country | Date |
|---|---|---|
| 9,440 | Great Britain | 1909 |